(12) United States Patent
Cai et al.

(10) Patent No.: US 8,438,231 B2
(45) Date of Patent: May 7, 2013

(54) TELECOMMUNICATION MESSAGING THROUGH A SOCIAL NETWORKING SERVICE

(75) Inventors: Yigang Cai, Naperville, IL (US); Suzann Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 457 days.

(21) Appl. No.: 12/684,234

(22) Filed: Jan. 8, 2010

(65) Prior Publication Data

US 2011/0173268 A1 Jul. 14, 2011

(51) Int. Cl.
*G06F 15/16* (2006.01)
(52) U.S. Cl.
USPC ............................ 709/206; 709/207; 709/204
(58) Field of Classification Search .......... 709/206–207, 709/204, 223
See application file for complete search history.

(56) References Cited

U.S. PATENT DOCUMENTS

| | | |
|---|---|---|
| 2007/0255807 A1 | 11/2007 | Hayashi et al. |
| 2008/0188261 A1* | 8/2008 | Arnone ...................... 455/550.1 |
| 2009/0082038 A1* | 3/2009 | McKiou et al. ............ 455/456.6 |
| 2010/0015991 A1* | 1/2010 | Evans et al. ................ 455/456.1 |
| 2010/0049852 A1* | 2/2010 | Whitnah et al. ............... 709/226 |
| 2010/0238919 A1* | 9/2010 | Froelich ......................... 370/352 |
| 2010/0293247 A1* | 11/2010 | McKee et al. .................. 709/218 |
| 2011/0106884 A1* | 5/2011 | Agarwal et al. ............... 709/204 |

FOREIGN PATENT DOCUMENTS

| | | |
|---|---|---|
| WO | WO2008094719 A2 | 8/2008 |
| WO | WO2009050739 A2 | 4/2009 |
| WO | WO2009070138 A1 | 6/2009 |
| WO | WO2009155599 A2 | 12/2009 |
| WO | WO2010001182 A2 | 1/2010 |

* cited by examiner

*Primary Examiner* — Philip B Tran
(74) *Attorney, Agent, or Firm* — Duft Bornsen & Fettig, LLP

(57) ABSTRACT

Systems and methods are disclosed for displaying telecommunication messages through a social networking service. One embodiment includes a telecommunication messaging system that is implemented with a social networking service. The telecom messaging system receives telecommunication messages from a telecommunication network that are associated with a directory number assigned to a phone. The phone is operated by a member of a web-based social networking service. The telecom messaging system provides a telecommunication messaging page to display the telecommunication messages to the member as part of a website for the social networking service. Thus, the member is able to view telecom messages, such as voicemail messages, text messages, call logs, etc., through the social networking service.

20 Claims, 13 Drawing Sheets

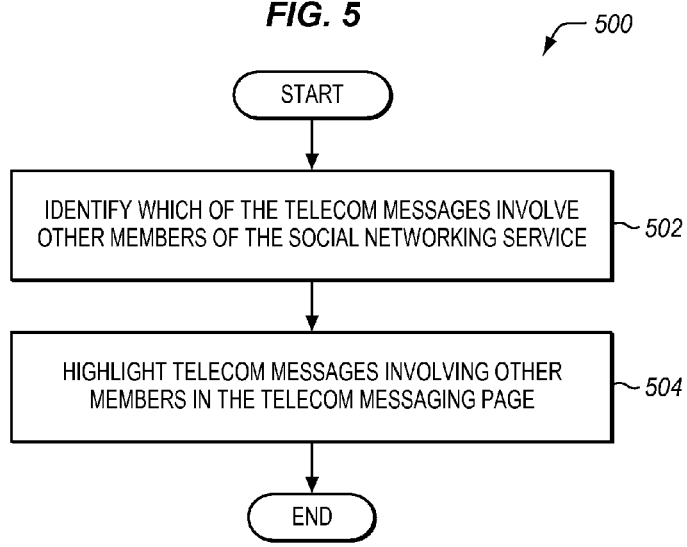
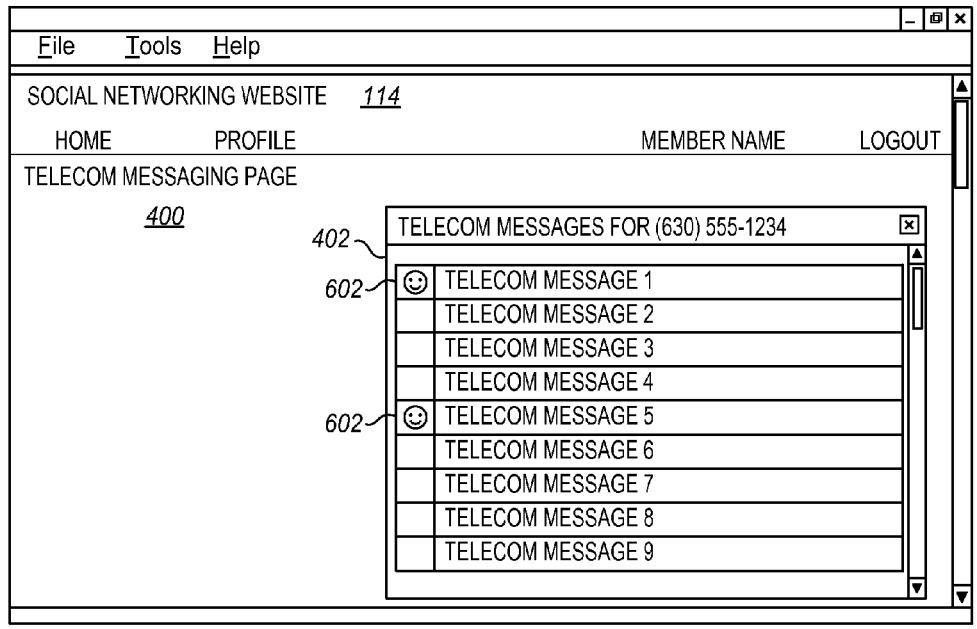

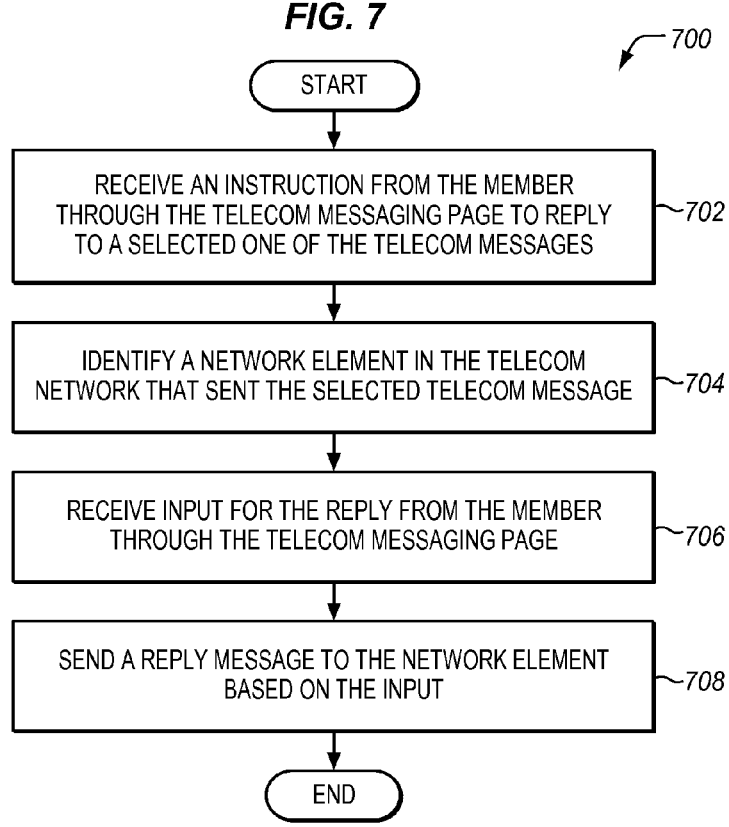
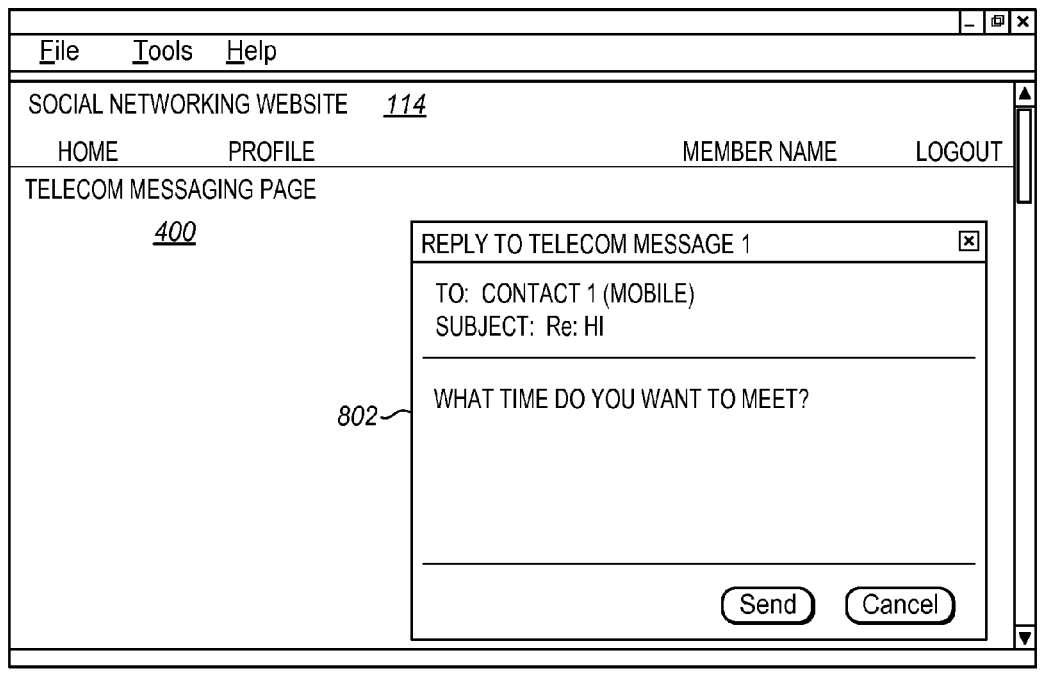

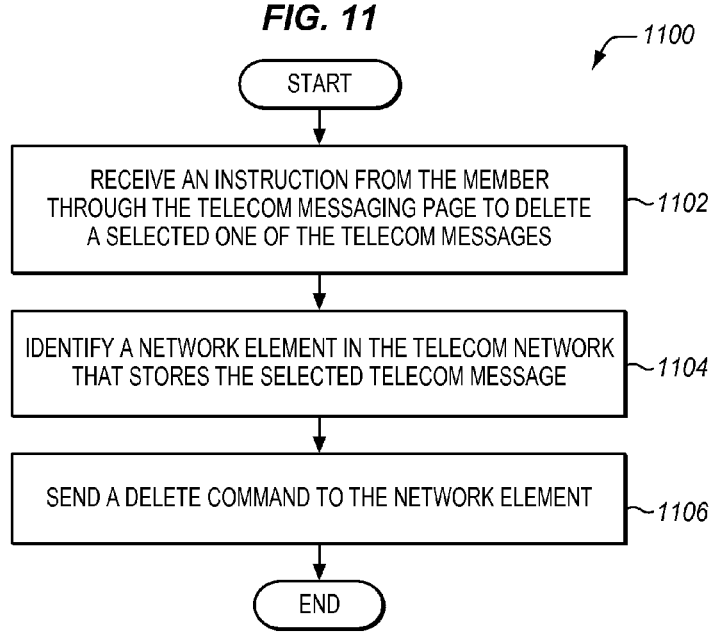
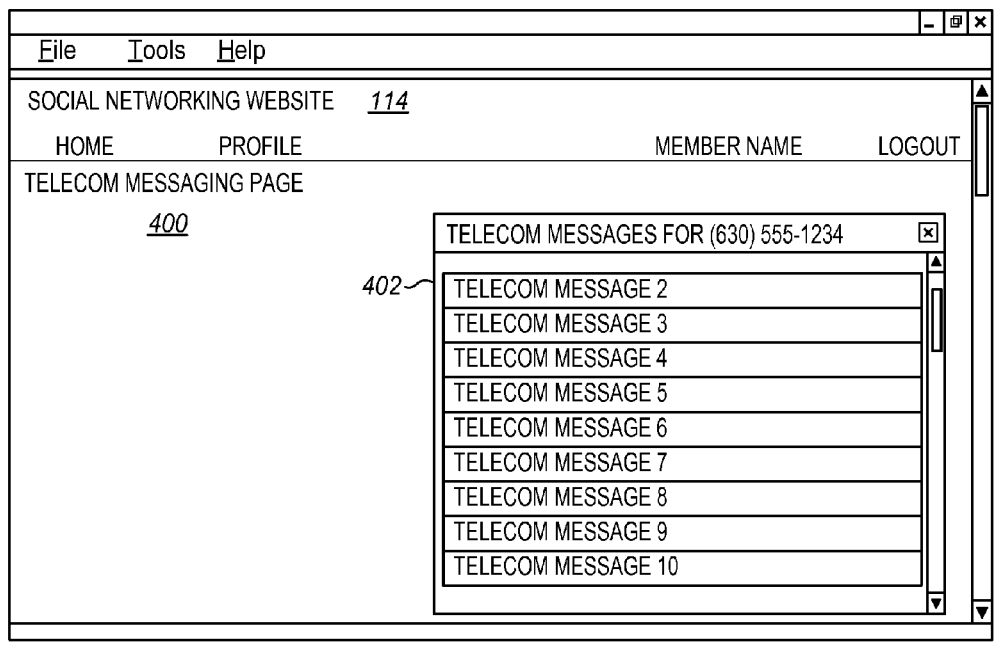

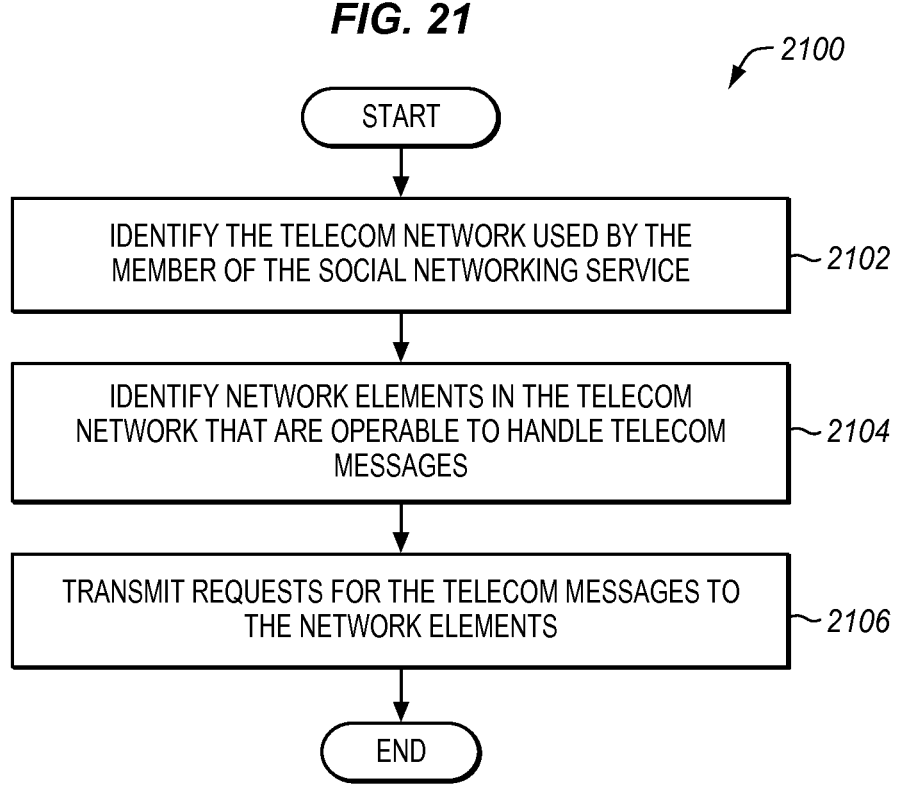

TELECOMMUNICATION MESSAGING THROUGH A SOCIAL NETWORKING SERVICE

BACKGROUND

1. Field of the Invention

The invention is related to the field of social networking services and, in particular, to messages displayed by a website of a social networking service.

2. Statement of the Problem

Social networking services are used to bring people together who share common interests or activities. Some examples of popular social networking services are Facebook®, Twitter™, MySpace™, and LinkedIn®. Most social networking services are web-based or internet-based, which means that members access the social network service through a website. The website allows a member to create a profile and interact with other members of the service, which in essence creates an online community of members that are able to communicate and share information.

Members of a social networking service are able to communicate or interact in limited ways through the website. For example, members may communicate via Instant Messaging (IM) through the website, via email through the website, via a bulletin board (i.e., one member may post a comment on a webpage of another member), etc. Although the members may communicate effectively through present social networking services, the members may desire to communicate in other ways that are not available.

SUMMARY

Embodiments described herein integrate telecommunication (telecom) messaging with social networking services so that a member of a social networking service may receive telecom-type messages through a social networking website. For example, when a member logs in to his/her account on the social networking website, the member may view voicemail messages, text (multimedia) messages, call logs, network-based address books, or other types of telecom messages. Thus, the social networking website provides a more comprehensive communication experience to the member instead of just IM and email.

One embodiment comprises a telecom messaging system that is implemented with a social networking service. The telecom messaging system includes a control system operable to receive telecom messages from a telecom network that are associated with a directory number assigned to a phone. The phone is operated by a member of a web-based social networking service. The telecom messaging system further includes a user interface operable to provide a telecom messaging page to display the telecom messages to the member as part of a website for the social networking service. Thus, the member is able to view telecom messages, such as voicemail messages, text messages, call logs, etc., through the telecom messaging page provided with the social networking service.

In another embodiment, the control system is further operable to receive an instruction from the member through the telecom messaging page to reply to a selected one of the telecom messages, to identify a network element in the telecom network that sent the selected telecom message, to receive input from the member through the telecom messaging page, and to send a reply message to the network element based on the input.

In another embodiment, the control system is further operable to receive an instruction from the member through the telecom messaging page to forward a selected one of the telecom messages, to identify a network element in the telecom network that sent the selected telecom message, to receive input from the member through the telecom messaging page, and to send a forward message to the network element based on the input.

In another embodiment, the control system is further operable to identify an instruction from the member through the telecom messaging page to delete a selected one of the telecom messages, to identify a network element in the telecom network that stores the selected telecom message, and to send a delete command to the network element.

In another embodiment, the control system is further operable to identify an instruction from the member through the telecom messaging page to compose a new telecom message, to identify a network element in the telecom network that handles the new telecom message, to receive input for the new telecom message from the member through the telecom messaging page, and to send the new telecom message to the network element based on the input.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 5 is a flow chart illustrating a method of highlighting telecom messages involving other members of the social networking service in an exemplary embodiment.

FIG. 6 illustrates a telecom messaging page within a social networking website in another exemplary embodiment.

FIG. 7 is a flow chart illustrating a method of replying to a telecom message in an exemplary embodiment.

FIG. 8 illustrates a telecom messaging page displaying a reply window in another exemplary embodiment.

FIG. 11 is a flow chart illustrating a method of deleting a telecom message in an exemplary embodiment.

FIG. 12 illustrates a telecom messaging page after deleting a telecom message in another exemplary embodiment.

FIG. 21 illustrates a method of pulling telecom messages from a network element in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
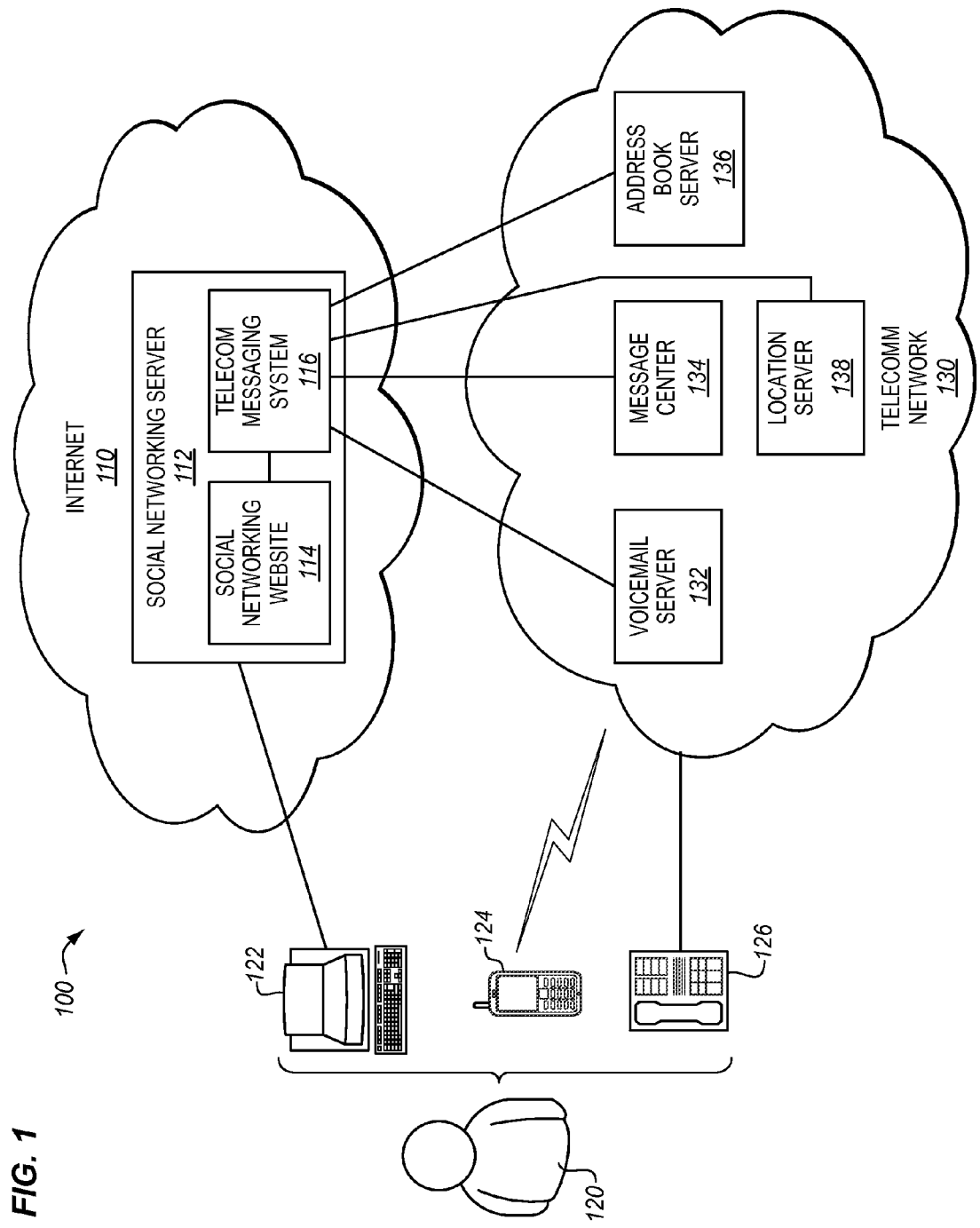
FIG. 1 illustrates a social networking environment in an exemplary embodiment.

FIG. 1 illustrates a social networking environment 100 in an exemplary embodiment. Social networking environment 100 generally refers to networks and systems that provide a web-based social networking service, which allows a plurality of members with common interests to interact. Social networking environment 100 includes a social networking server 112 that is implemented in a packet-based network, such as internet 110. Social networking server 112 represents one or more servers that provide the social networking service. As part of the social networking service, social networking server 112 generates one or more social networking websites 114. Website 114 may represent a home webpage for a group of members, a home webpage for individual members, etc.

FIG. 1 shows a member 120 of the social networking service. Member 120 is able to access the social networking service through a computer (or PC) 122. Member 120 may also have a mobile phone 124 and a landline phone 126 in this embodiment. Mobile phone 124 and/or a landline phone 126 connect with a telecom network 130 to provide member 120 with telecom services, which include voice calls, voicemail, text messaging, multimedia messaging, etc. Those skilled in the art will appreciate that member 120 may also access the social networking service over mobile phone 124 and/or landline phone 126 (if properly enabled).

Telecom network 130 may comprise a circuit-based network, such as a Public Switched Telecommunication Network (PSTN), a CDMA (mobile) network, or a GSM (mobile) network. Telecom network 130 may alternatively comprise a packet-based network, such as an IP Multimedia Subsystem (IMS) network. Although telecom network 130 may include a variety of network elements that are not shown for the sake of brevity, FIG. 1 shows a voicemail server 132, a message center 134, an address book server 136, and a location server 138.

Voicemail server (VMS) 132 comprises any server or node operable to collect and store voicemail messages. Message center 134 comprises any server or node operable to handle text messages within telecom network 130. One example of text messaging is Short Message Service (SMS), which is a communication protocol allowing the exchange of short text messages (i.e., 160 characters) between devices. The term "text message" as used herein refers to text-only messages and also refers to multimedia messages, such as images, video, sound content, etc. The text-only messages may be sent using SMS protocol, while the multimedia messages may be sent using Multimedia Service (MMS) protocol. Address book server 136 comprises any server or node operable to store a network-based address book for member 120. Location server 138 comprises any server or node operable to determine the location of mobile devices, such as mobile device 124 of member 120.

In the embodiments provided herein, a telecom messaging system 116 has been added to enhance the communication capabilities within the social networking service. At a high level, telecom messaging system 116 is able to exchange messages with voicemail server 132, message center 134, address book server 136, location server 138, etc, and to display telecom messages to member 120 through social networking website 114. As previously mentioned, social networking website 114 traditionally only provided the members with non-telephony communications, such as IM, email, bulletin boards, etc. Telecom messaging system 116 expands the communication capabilities through the social networking website 114 to include telecom messages. A telecom message comprises a telephony message regarding communications over telecom network 130. Examples of telecom messages include voicemail messages, text messages, call logs, etc.

Figure 2:
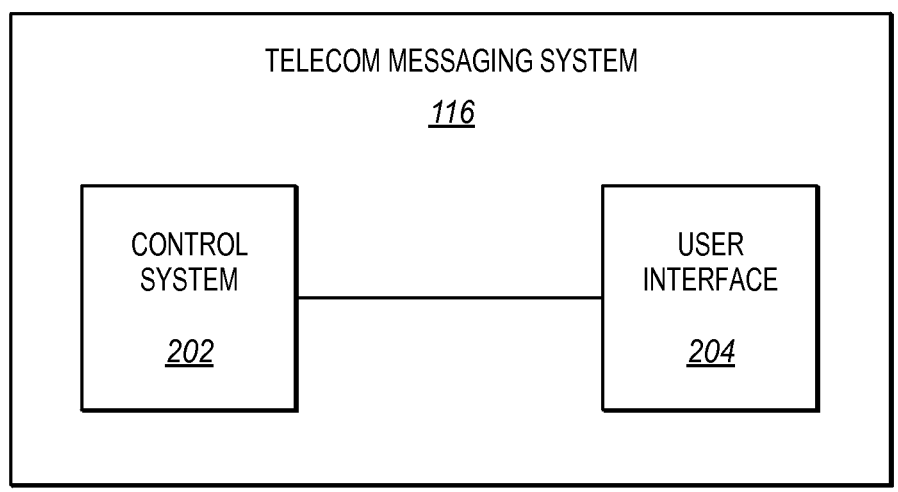
FIG. 2 illustrates a telecom messaging system in an exemplary embodiment.

FIG. 2 illustrates telecom messaging system 116 in an exemplary embodiment. Telecom messaging system 116 includes a control system 202 and a user interface 204. Control system 202 comprises any device, component, or element operable to collect telecom messages from telecom network 130 (see FIG. 1) that are applicable to a member of the social networking service. User interface 204 comprises any device, component, or element operable to display the telecom messages as part of the social networking service. For example, user interface 204 may generate a webpage that displays the telecom messages for a member. A more detailed operation of telecom messaging system 116 is illustrated in FIG. 3.

Figure 3:
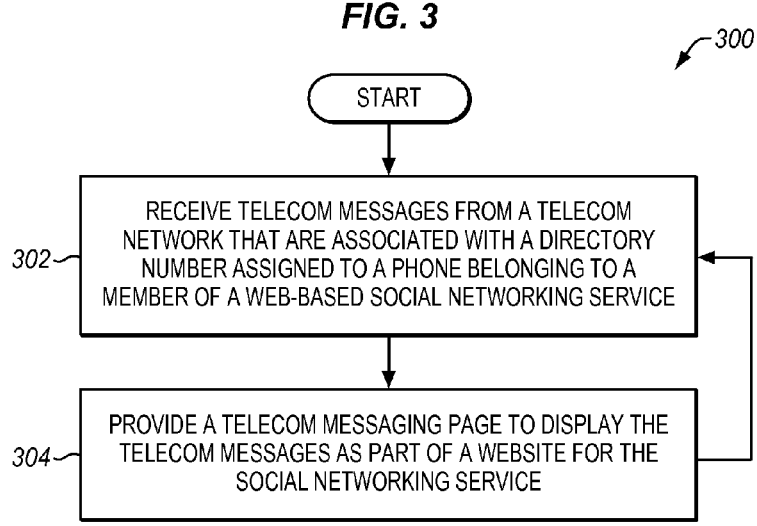
FIG. 3 is a flow chart illustrating a method of providing telecom messaging through the social networking service in an exemplary embodiment.

FIG. 3 is a flow chart illustrating a method 300 of providing telecom messaging through the social networking service in an exemplary embodiment. The steps of method 300 will be described with reference to social networking environment 100 in FIG. 1 and telecom messaging system 116 in FIG. 2, but those skilled in the art will appreciate that method 300 may be performed in other networks and systems. The steps of the flow charts described herein are not all inclusive and may include other steps not shown. The steps may also be performed in an alternative order.

In step 302, control system 202 receives one or more telecom messages from telecom network 130 that are associated with a directory number assigned to a phone. The phone is operated by a member 120 of the social networking service. For example, mobile phone 124 of member 120 (in FIG. 1) has an associated directory number, such as (630) 555-1234. Thus, control system 202 receives one or more telecom messages from telecom network 130 that is associated with the directory number assigned to mobile phone 124. As an example, control system 202 may receive a text message that is sent to (630) 555-1234. Control system 202 may also receive a voicemail message that was left for (630) 555-1234.

In step 304, user interface 204 provides a telecom messaging page (or portal) to display the telecom messages as part of a website 114 for the social networking service. User interface 204 may display the telecom messages in any desired manner. For example, a social networking website typically includes a home page for a member. The home page may include an icon or link to the telecom messaging page provided or generated by telecom messaging system 116. The telecom messaging page displays the telecom messages that are received for member 120. The term "telecom messaging page" may refer to multiple web-pages that are generated by user interface 204.

Figure 4:
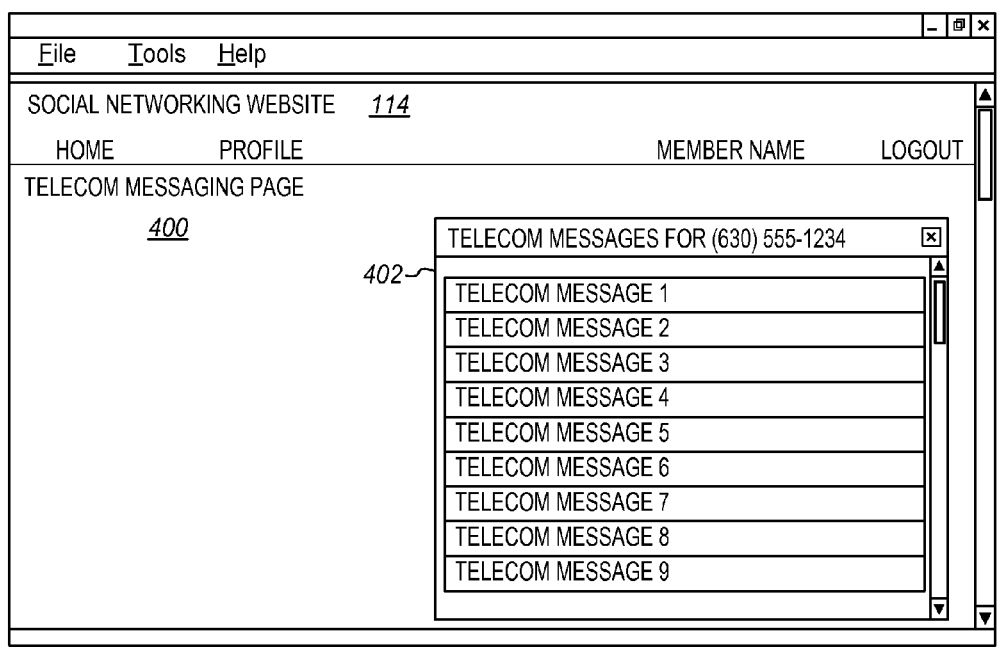
FIG. 4 illustrates a telecom messaging page within a social networking website in an exemplary embodiment.

FIG. 4 illustrates a telecom messaging page 400 within social networking website 114 in an exemplary embodiment. As shown in this embodiment, telecom messaging page 400 displays a list 402 of telecom messages for directory number (630) 555-1234 that are viewable by member 120. Thus, member 120 may advantageously view his/her telecom messages through social networking website 114 instead of having to view the messages using mobile phone 124.

In another embodiment, other members of the social networking service may be highlighted in telecom messaging page 400, as is described in FIGS. 5-6. FIG. 5 is a flow chart illustrating a method 500 of highlighting telecom messages involving other members of the social networking service in an exemplary embodiment. The steps of method 500 will be described with reference to social networking environment 100 in FIG. 1 and telecom messaging system 116 in FIG. 2, but those skilled in the art will appreciate that method 500 may be performed in other networks and systems.

After receiving one or more telecom messages from telecom network 130 (see step 302 in FIG. 3), control system 202 identifies which (if any) of the telecom messages involve other members of the social networking service in step 502. For example, if a telecom message was sent by another member of the social networking service or was destined for another member of the social networking service, then that telecom message "involves" another member. In step 504, user interface 204 highlights or emphasizes the telecom messages involving other members in telecom messaging page 400. User interface 204 may highlight the telecom messages in any desired manner. For example, user interface 204 may display the telecom messages in a different color, may display the telecom messages in bold, may display an icon next to the telecom messages, etc.

FIG. 6 illustrates a telecom messaging page 400 within social networking website 114 in another exemplary embodiment. Telecom messaging page 400 again displays the list 402 of telecom messages for directory number (630) 555-1234. However, telecom message 1 and telecom message 5 were identified as involving (received from or destined to) another member of the social networking service. Thus, user interface 204 displays an icon 602 next to these messages in telecom messaging page 400. The icon 602 may be a picture of the member from their profile in the social networking service, or any other desired data.

Through the telecom messaging page 400 displayed by user interface 204 (see FIG. 4 or 6), member 120 may perform a variety of functions. Member 120 may select a telecom message and view additional details of the message. Member 120 may reply to a telecom message. Member 120 may forward a telecom message. Member 120 may also delete a telecom message, or compose a new telecom message. FIGS. 7-14 illustrate performing these functions on the telecom messages.

FIG. 7 is a flow chart illustrating a method 700 of replying to a telecom message in an exemplary embodiment. The steps of method 700 will be described with reference to social networking environment 100 in FIG. 1 and telecom messaging system 116 in FIG. 2, but those skilled in the art will appreciate that method 700 may be performed in other networks and systems.

Assume in FIG. 6 that member 120 selects telecom message 1 in telecom messaging page 400, and also inputs or selects an instruction through telecom messaging page 400 to reply to telecom message 1. For example, member 120 may right-click on telecom message 1 which provides a list of options, one of which is to reply to the message. In FIG. 7, control system 202 receives the instruction from member 120 through telecom messaging page 400 to reply to the selected telecom message (e.g., telecom message 1) in step 702. In step 704, control system 202 identifies a network element in telecom network 130 that sent the selected telecom message. For example, if the selected telecom message is a text message, then control system 202 identifies a message center 134 in telecom network 130 that sent the text message to control system 202. Control system 202 may process the selected telecom message to identify the network element, such as by processing the originating address field of the text message. Control system 202 may also be pre-provisioned with the identities (or network addresses) for network elements within telecom network 130.

In step 706, control system 202 receives input from member 120 through the telecom messaging page 400. The input may be text, an image, a picture, etc, that member 120 wants to include in the reply. In step 708, control system 202 sends a reply message to the network element based on the input. When sending the reply message, control system 202 encapsulates the reply message in the appropriate signaling message for telecom network 130, such as a MAP message, an ANSI message, a SIP message, etc. Control system 202 may be pre-provisioned with the signaling protocol for telecom network 130, or may dynamically determine the signaling protocol before sending the reply message.

FIG. 8 illustrates a telecom messaging page 400 displaying a reply window 802 in another exemplary embodiment. Telecom messaging page 400 in this embodiment displays a reply window 802 that allows member 120 to enter text and other data in the reply to telecom message 1. This reply message is sent to the appropriate network element in telecom network 130. The network element may then deliver the reply message to the destination in a conventional manner.

Figure 9:
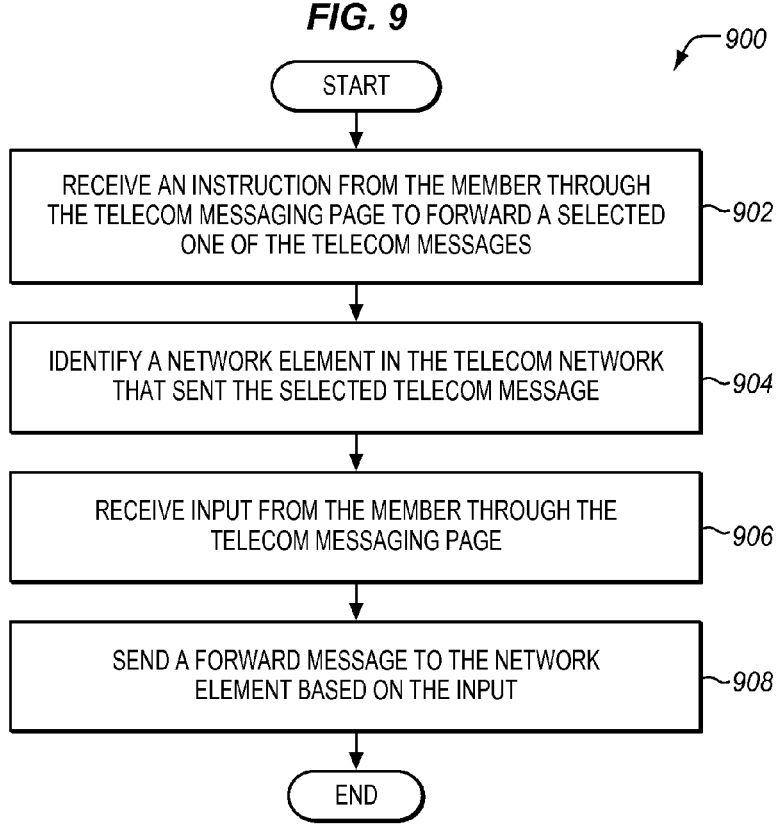
FIG. 9 is a flow chart illustrating a method of forwarding a telecom message in an exemplary embodiment.

FIG. 9 is a flow chart illustrating a method 900 of forwarding a telecom message in an exemplary embodiment. The steps of method 900 will be described with reference to social networking environment 100 in FIG. 1 and telecom messaging system 116 in FIG. 2, but those skilled in the art will appreciate that method 900 may be performed in other networks and systems.

Assume again in FIG. 6 that member 120 selects telecom message 2 in telecom messaging page 400, and also inputs or selects an instruction through telecom messaging page 400 to forward telecom message 2. For example, member 120 may right-click on telecom message 2 which provides a list of options, one of which is to forward the message. In FIG. 9, control system 202 receives the instruction from member 120 through telecom messaging page 400 to forward the selected telecom message (e.g., telecom message 2) in step 902. In step 904, control system 202 identifies a network element in telecom network 130 that sent the selected telecom message. In step 906, control system 202 receives input from member 120 through telecom messaging page 400. In step 908, control system 202 sends a forward message to the network element based on the input.

Figure 10:
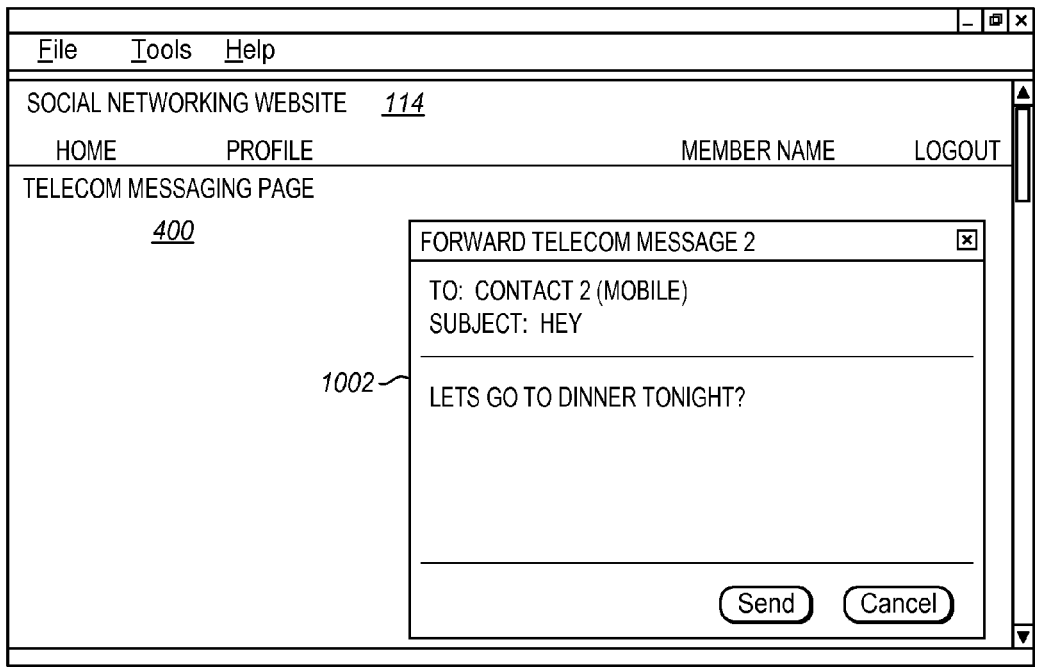
FIG. 10 illustrates a telecom messaging page displaying a forward window in another exemplary embodiment.

FIG. 10 illustrates a telecom messaging page 400 displaying a forward window 1002 in another exemplary embodiment. Telecom messaging page 400 in this embodiment displays forward window 1002 that allows member 120 to enter one or more destinations, text, and other data when forwarding telecom message 2. This forward message is sent to the appropriate network element in telecom network 130. The network element may then deliver the forward message to the destination in a conventional manner.

FIG. 11 is a flow chart illustrating a method 1100 of deleting a telecom message in an exemplary embodiment. The steps of method 1100 will be described with reference to social networking environment 100 in FIG. 1 and telecom messaging system 116 in FIG. 2, but those skilled in the art will appreciate that method 1100 may be performed in other networks and systems.

Assume again in FIG. 6 that member 120 selects telecom message 1 in telecom messaging page 400, and also inputs or selects an instruction through telecom messaging page 400 to delete telecom message 1. For example, member 120 may right-click on telecom message 1 which provides a list of options, one of which is to delete the message. In FIG. 11, control system 202 receives the instruction from member 120 through telecom messaging page 400 to delete the selected telecom message (e.g., telecom message 1) in step 1102. In response to this instruction, control system 202 is able to delete the selected telecom message from telecom messaging page 400. FIG. 12 illustrates a telecom messaging page 400 after deleting a telecom message in another exemplary embodiment. Telecom messaging page 400 in this embodiment displays the telecom messages as before, but telecom message 1 has been deleted from the list 402.

It may be beneficial for the telecom message to also be deleted in telecom network 130. For instance, assume that telecom message 1 (which was deleted) represents a voicemail message, and a copy of the voicemail message is stored in voicemail server 132 (see FIG. 1). If member 120 listens to the voicemail message through telecom messaging page 400 and deletes the message, then the message should also be deleted from voicemail server 132.

To delete telecom messages from telecom network 130, control system 202 identifies a network element in telecom network 130 that stores the selected telecom message in step 1104. In step 1106, control system 202 sends a delete command to the network element. The delete command may include a message ID or some other information so that the network element may locate the telecom message in storage. Before sending the delete command, control system 202 may identify a command set used by the network element in telecom network 130 to delete a message. Control system 202 may be pre-provisioned with the command set for telecom network 130, or may dynamically determine the command set before sending the delete command. The network element receiving the delete command then deletes the telecom message from memory.

Figure 13:
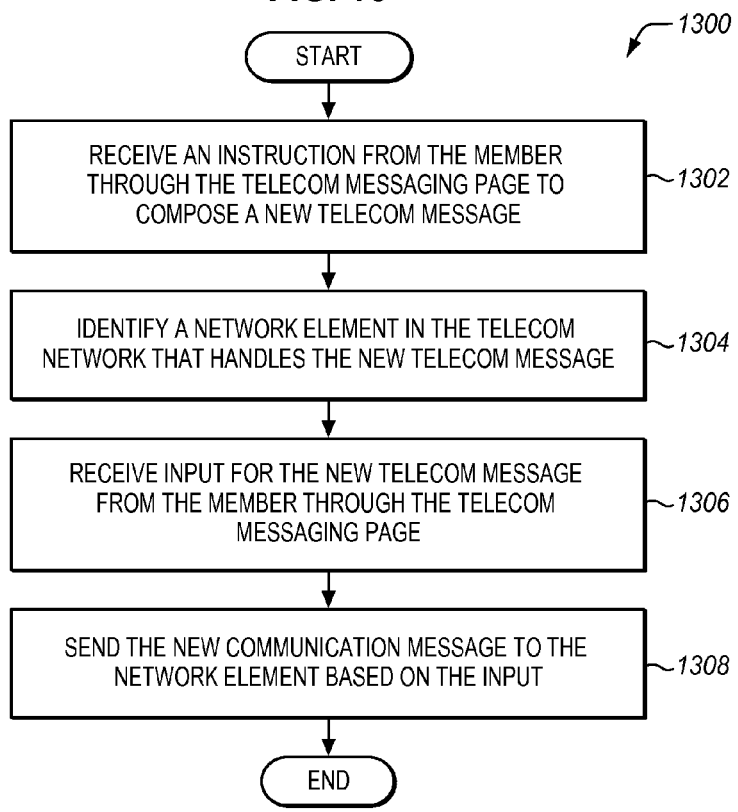
FIG. 13 is a flow chart illustrating a method of composing a new telecom message in an exemplary embodiment.

FIG. 13 is a flow chart illustrating a method 1300 of composing a new telecom message in an exemplary embodiment. The steps of method 1300 will be described with reference to social networking environment 100 in FIG. 1 and telecom messaging system 116 in FIG. 2, but those skilled in the art will appreciate that method 1300 may be performed in other networks and systems.

Assume in FIG. 6 that member 120 wants to compose a new telecom message through telecom messaging page 400. For example, member 120 may right-click on telecom messaging page 400 to display a list of options, one of which is to compose a new telecom message (e.g., an SMS message, an MMS message). Member 120 may then select the option to compose a new message. In FIG. 13, control system 202 receives the instruction from member 120 through telecom messaging page 400 to compose a new telecom message in step 1302. In step 1304, control system 202 identifies a network element in telecom network 130 that handles the new telecom message. For example, if the selected telecom message is a text message, then control system 202 identifies a message center 134 in telecom network 130 that handles text messages. In step 1306, control system 202 receives input for the new telecom message from member 120 through telecom messaging page 400. In step 1308, control system 202 sends the new telecom message to the network element based on the input.

Figure 14:
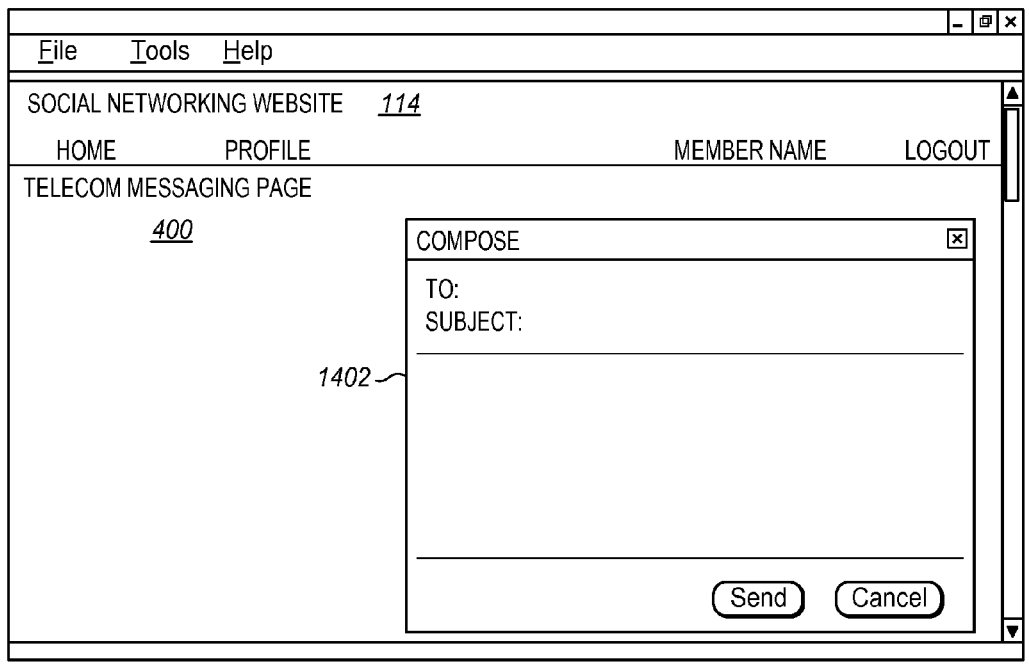
FIG. 14 illustrates a telecom messaging page displaying a compose window in another exemplary embodiment.

FIG. 14 illustrates a telecom messaging page 400 displaying a compose window 1402 in another exemplary embodiment. Telecom messaging page 400 in this embodiment displays a compose window 1402 that allows member 120 to enter destination numbers, text, and other data in the new telecom message. This new telecom message is sent to the appropriate network element in telecom network 130, and the network element may then deliver the new telecom message to the destination(s) in a conventional manner.

The above embodiments have shown how telecom messages may be displayed to member 120 through the social networking website 114. There may be other embodiments where telecom messaging system 116 receives other telecom-type information other than messages. For example, member 120 may have a network-based address book that is stored in telecom network 130. Network-based address book is a database used for storing entries referred to as contacts. Each contact entry usually includes of a few standard fields, such as first name, last name, mailing address, home directory number, mobile directory number, e-mail address, etc.

Figure 15:
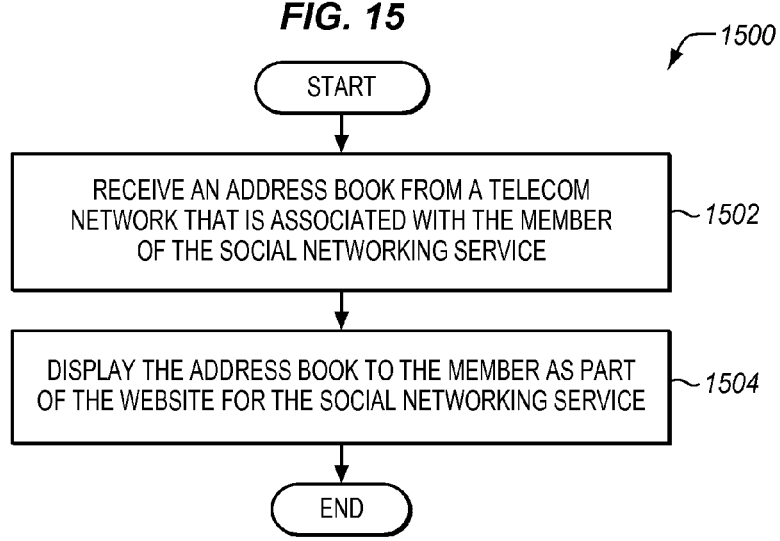
FIG. 15 is a flow chart illustrating a method of providing an address book through the social networking service in an exemplary embodiment.

In FIG. 1, member 120 has an address book stored in address book server 136. This address book may be accessible to member 120 through the social networking website 114 as described below. FIG. 15 is a flow chart illustrating a method 1500 of providing an address book through the social networking service in an exemplary embodiment. The steps of method 1500 will be described with reference to social networking environment 100 in FIG. 1 and telecom messaging system 116 in FIG. 2, but those skilled in the art will appreciate that method 1500 may be performed in other networks and systems.

In step 1502, control system 202 receives the address book from telecom network 130 that is associated with member 120. Control system 202 may query address book server 136 to retrieve the address book, or address book server 136 may periodically send the address book to control system 202. In step 1504, user interface 204 provides telecom messaging page 400 to display the address book as part of the social networking service.

Figure 16:
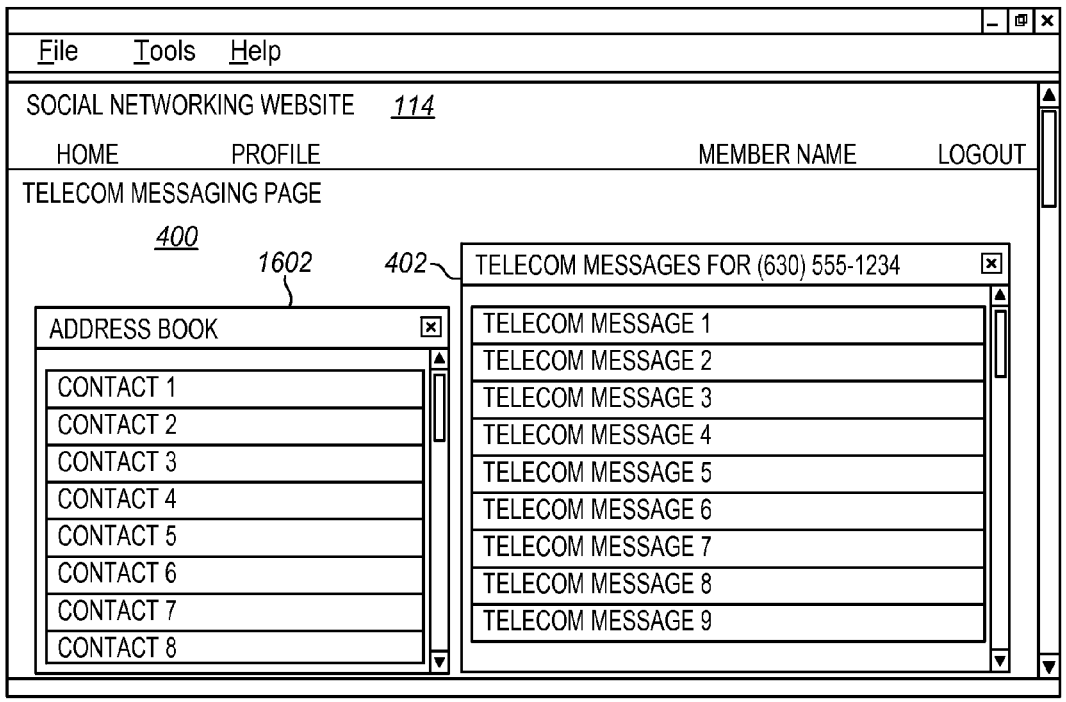
FIG. 16 illustrates a telecom messaging page within a social networking website in another exemplary embodiment.

FIG. 16 illustrates a telecom messaging page 400 within a social networking website 114 in another exemplary embodiment. As shown in this embodiment, telecom messaging page 400 displays the list 402 of telecom messages for directory number (630) 555-1234 that are viewable by member 120, and also displays an address book 1602 for member 120. The address book 1602 includes a plurality of contacts that were defined by member 120. Member 120 may advantageously view his/her address book through social networking website 114 instead of having to view the address book using mobile phone 124.

After receiving the address book 1602 from telecom network 130 (see step 1502 in FIG. 15), control system 202 identifies which (if any) of the contacts in the address book comprise members of the social networking service. User interface 204 then highlights or emphasizes the contacts in the address book that comprise members of the social networking service. For example, user interface 204 may display the contacts in a different color, may display the contacts in bold, may display an icon next to the contacts, etc.

Figure 17:
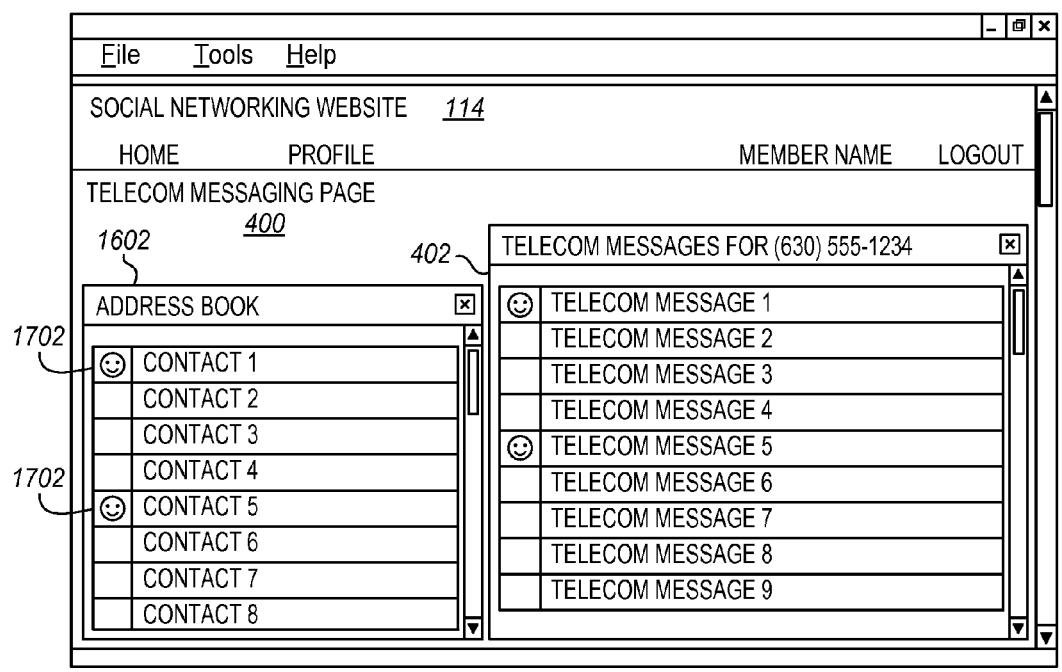
FIG. 17 illustrates a telecom messaging page within a social networking website in another exemplary embodiment.

FIG. 17 illustrates a telecom messaging page 400 within a social networking website 114 in another exemplary embodiment. Telecom messaging page 400 again displays the address book for member 120. However, contacts 1 and contact 5 in the address book were identified as being members of the social networking service. Thus, user interface 204 displays an icon 1702 next to these contacts. The icon 1702 may be a picture of the member from their profile in the social networking service, or any other desired data.

Control system 202 may also display location information to member 120 through telecom messaging page. For example, control system 202 may receive location information from location server 138 that is associated with mobile phone 124. Control system 202 may query location server 138 to retrieve the location information, or location server 138 may periodically send the location information to control system 202. User interface 204 may then display the location information to member 120 through telecom messaging page 400. The location information may be in the form of a map or any other geographical representation.

Figure 18:
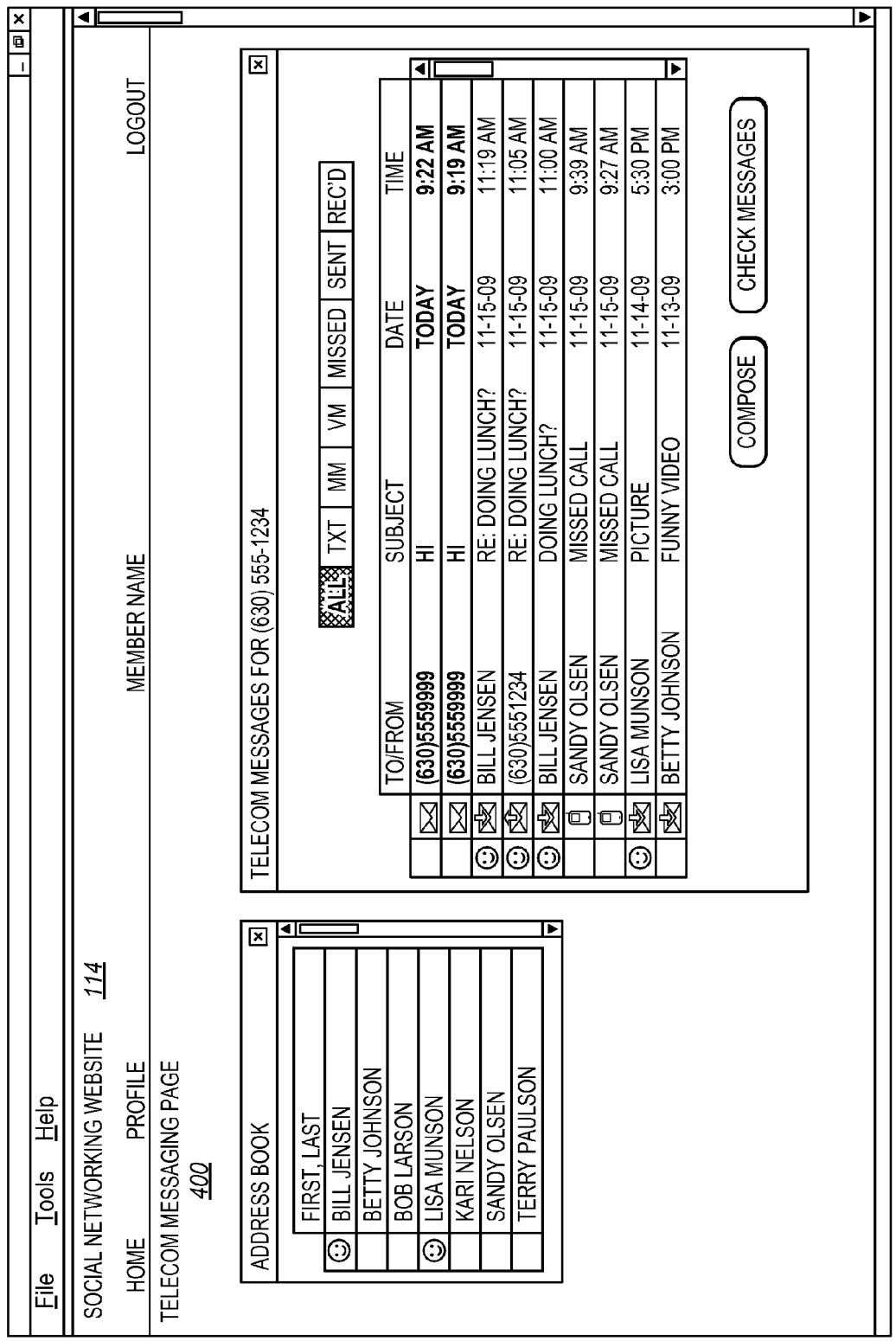
FIG. 18 illustrates a detailed example of a telecom messaging page within a social networking website in another exemplary embodiment.

FIG. 18 illustrates a detailed example of telecom messaging page 400 within a social networking website 114 in another exemplary embodiment. Those skilled in the art will appreciate that FIG. 18 represents just one example, and telecom messaging pages may take on other forms.

As shown in FIG. 18, telecom messaging page 400 displays multiple types of telecom messages. For example, telecom messaging page 400 displays unopened text or SMS messages received from the directory number (630) 555-9999. Telecom messaging page 400 displays text or SMS messages exchanged with Bill Jensen. Telecom messaging page 400 displays two missed calls from Sandy Olsen (call log). Telecom messaging page 400 even further displays multimedia messages received from Lisa Munson and Betty Johnson. Member 120 can thus view virtually any telecom message through telecom messaging page 400, and does not need to look at his/her mobile phone 124 while logged into social networking website 114. This gives member 120 greater communication capabilities within social networking website 114, which is important as social networking websites 114 become more popular.

Figure 19:
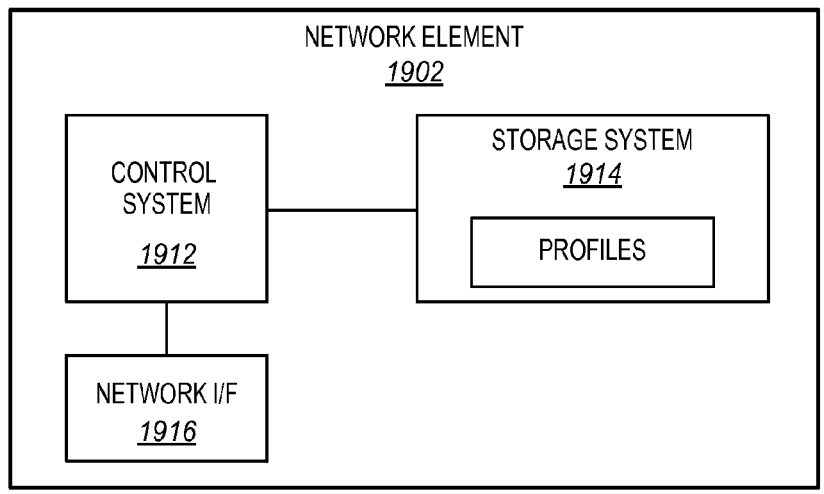
FIG. 19 illustrates a network element of a telecom network in an exemplary embodiment.

In addition to adding telecom messaging system 116, one or more network elements in telecom network 130 may be modified or enhanced to allow the telecom messages to be displayed through the social networking website 114. FIG. 19 illustrates a network element 1902 of telecom network 130 in an exemplary embodiment. Network element 1902 may represent voicemail server 132 or message center 134 in FIG. 1, or may represent other network elements that are not shown. Network element 1902 includes a storage system 1912, a control system 1914, and a network interface 1916. Storage system 1912 comprises any memory, cache, or other storage mechanism that is operable to store data. Control system 1914 comprises any device, component, or element operable to send copies of telecom messages to a telecom messaging system of a social networking service. Network interface 1916 comprises any device, component, or element operable to communicate with telecom messaging system 116. For example, network interface 1916 may comprise a Simple Mail Transport Protocol (SMTP) interface, a Short Message Peer-to-Peer (SMPP) Protocol interface, an MM7 interface, a Lightweight Directory Access Protocol (LDAP) interface, etc.

Figure 20:
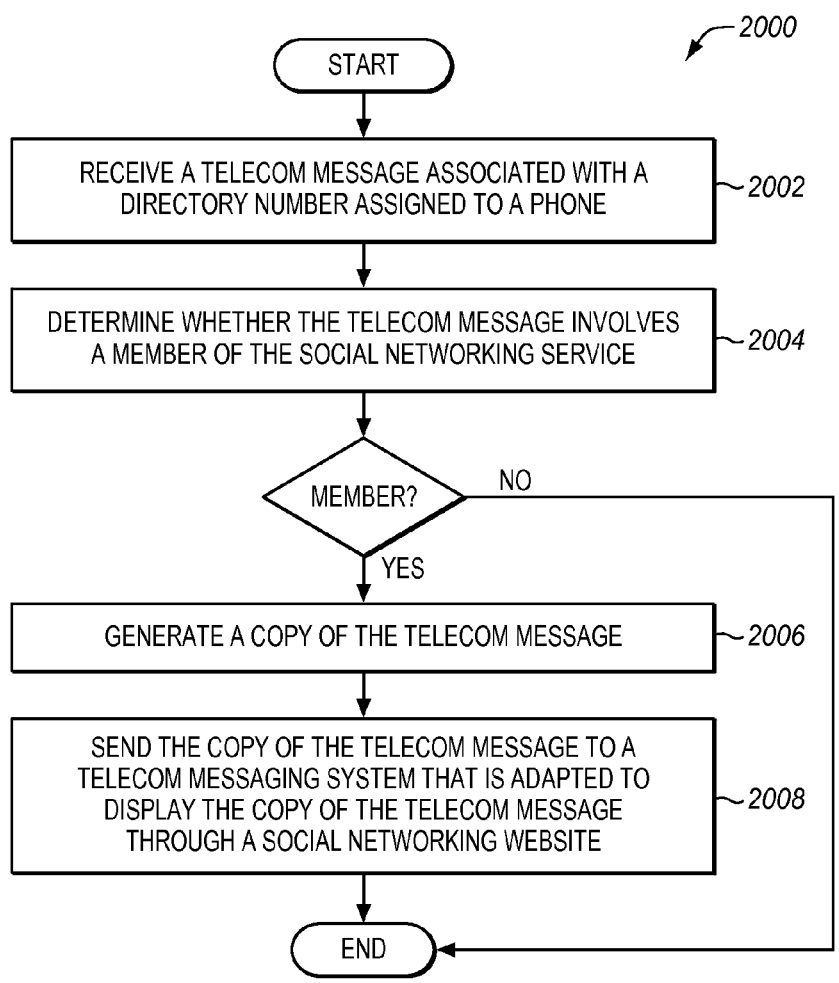
FIG. 20 illustrates a method of operating a network element in an exemplary embodiment.

FIG. 20 illustrates a method 2000 of operating network element 1902 in an exemplary embodiment. The steps of method 2000 will be described with reference to social networking environment 100 in FIG. 1 and network element 1902 in FIG. 19, but those skilled in the art will appreciate that method 2000 may be performed in other networks and systems.

In step 2002, control system 1912 receives a telecom message that is associated with a directory number of a phone, such as mobile phone 124 (see FIG. 1). In step 2004, control system 1912 determines whether the telecom message is associated with a member 120 of the social networking service. For example, control system 1912 may be provisioned with profiles for members of the social networking service, which are stored in storage system 1914. When the telecom message is received, control system 1912 is able to process a directory number in the telecom message and the profiles of the members to determine whether the telecom message is associated with a member of the social network service. If so, control system 1912 generates a copy of the telecom message in step 2006. In step 2008, network interface 1916 sends the copy of the telecom message to telecom messaging system 116 so that system 116 may display the copy of the telecom message through the social networking website 114.

In the embodiment of FIG. 20, network element 1902 acts to push telecom messages to telecom messaging system 116. Telecom messaging system 116 may also operate to pull telecom messages from network element 1902, which is further illustrated in FIG. 21.

FIG. 21 illustrates a method 2100 of pulling telecom messages from a network element 1902 in an exemplary embodiment. The steps of method 2100 will be described with reference to social networking environment 100 in FIG. 1 and telecom messaging system 116 in FIG. 2, but those skilled in the art will appreciate that method 2100 may be performed in other networks and systems.

In step 2102, control system 202 identifies a telecom network 130 used by member 120 of the social networking service. Because member 120 may use multiple telecom networks 130, control system 202 may perform the steps of method 2100 multiple times for different networks. In step 2104, control system 202 identifies one or more network elements in telecom network 130 that are operable to handle or store telecom messages for member 120. For example, control system 202 may identify voicemail server 132 and message center 134 in FIG. 1. In step 2106, control system 202 transmits requests for the telecom messages to the network elements. In response to the requests for telecom messages, control system 202 will receive the telecom messages from the network elements as is indicated in step 302 of FIG. 3. Telecom messaging system 116 thus pulls the telecom messages from the network elements, such as when member 120 logs into this her account with the social networking service. Telecom messaging system 116 may pull the telecom messages periodically from the network elements, such as every minute, every five minutes, etc. The frequency of the pull operation may also vary depending on factors such as network congestion, time of day, day of week, etc.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A telecommunication messaging system comprising:
   a control system operable to receive telecommunication messages from a telecommunication network that are addressed by users to a directory number assigned to a phone, wherein the phone is operated by a member of a web-based social networking service and the telecommunication messages are received at the phone from multiple other phones, the control system further operable to collect the telecommunication messages for the phone received via the telecommunication network; and
   a user interface operable to provide a telecommunication messaging page to display the collected telecommunication messages to the member as part of a website for the social networking service, to distinguish telecommunication messages addressed to the directory number that involve other members of the social networking service from telecommunication messages addressed to the directory number that do not involve other members of the social networking service based on input from the control system, and to highlight the telecommunication messages that involve other members in the telecommunication messaging page.

2. The telecommunication messaging system of claim 1 wherein:
   the user interface is further operable to highlight telecommunication messages by displaying an icon next to the telecommunication messages.

3. The telecommunication messaging system of claim 1 wherein:
   the control system is further operable to receive an instruction from the member through the telecommunication messaging page to reply to a selected one of the telecommunication messages, to identify a network element in the telecommunication network that sent the selected telecommunication message, to receive input from the member through the telecommunication messaging page, and to send a reply message to the network element based on the input.

4. The telecommunication messaging system of claim 1 wherein:
   the control system is further operable to receive an instruction from the member through the telecommunication messaging page to forward a selected one of the telecommunication messages, to identify a network element in the telecommunication network that sent the selected telecommunication message, to receive input from the member through the telecommunication messaging page, and to send a forward message to the network element based on the input.

5. The telecommunication messaging system of claim 1 wherein:
   the control system is further operable to receive an instruction from the member through the telecommunication messaging page to delete a selected one of the telecommunication messages, to identify a network element in the telecommunication network that stores the selected telecommunication message, and to send a delete command to the network element.

6. The telecommunication messaging system of claim 1 wherein:
   the control system is further operable to receive an instruction from the member through the telecommunication messaging page to compose a new telecommunication message, to identify a network element in the telecommunication network that handles the new telecommunication message, to receive input for the new telecommunication message from the member through the telecommunication messaging page, and to send the new telecommunication message to the network element based on the input.

7. The telecommunication messaging system of claim 1 wherein:
   the control system is further operable to receive a network-based address book from the telecommunication network that is associated the member; and
   the user interface is further operable to display the address book to the member through the telecommunication messaging page.

8. The telecommunication messaging system of claim 1 wherein:
   the control system is further operable to identify the telecommunication network used by the member of the social networking service, to identify network elements in the telecommunication network that are operable to store the telecommunication messages, to transmit requests for the telecommunication messages to the network elements, and to receive the telecommunication messages from the network elements in response to the requests.

9. The telecommunication messaging system of claim 1 wherein the telecommunication messages comprise voice-mail messages associated with the directory number.

10. The telecommunication messaging system of claim 1 wherein the telecommunication messages comprise text messages associated with the directory number.

11. A method comprising:
    receiving telecommunication messages addressed by users to a directory number assigned to a phone, wherein the phone is operated by a member of a web-based social networking service and the telecommunication messages are received at the phone from multiple other phones;
    collecting the telecommunication messages for the phone received via the telecommunication network;

providing a telecommunication messaging page to display the telecommunication messages to the member as part of a website for the social networking service;

distinguishing telecommunication messages addressed to the directory number that involve other members of the social networking service from telecommunication messages addressed to the directory number that do not involve other members of the social networking service; and highlighting the telecommunication messages that involve other members in the telecommunication messaging page.

12. The method of claim 11 further comprising:
the highlighting telecommunication messages by displaying an icon next to the telecommunication messages.

13. The method of claim 11 further comprising:
receiving an instruction from the member through the telecommunication messaging page to reply to a selected one of the telecommunication messages;
identifying a network element in the telecommunication network that sent the selected telecommunication message;
receiving input from the member through the telecommunication messaging page; and
sending a reply message to the network element based on the input.

14. The method of claim 11 further comprising:
receiving an instruction from the member through the telecommunication messaging page to forward a selected one of the telecommunication messages;
identifying a network element in the telecommunication network that sent the selected telecommunication message;
receiving input from the member through the telecommunication messaging page; and
sending a forward message to the network element based on the input.

15. The method of claim 11 further comprising:
receiving an instruction from the member through the telecommunication messaging page to delete a selected one of the telecommunication messages;
identifying a network element in the telecommunication network that stores the selected telecommunication message;
sending a delete command to the network element.

16. The method of claim 11 further comprising:
receiving an instruction from the member through the telecommunication messaging page to compose a new telecommunication message;
identifying a network element in the telecommunication network that handles the new telecommunication message;
receiving input for the new telecommunication message from the member through the telecommunication messaging page; and
sending the new telecommunication message to the network element based on the input.

17. The method of claim 11 further comprising:
receiving a network-based address book from the telecommunication network that is associated with the member; and
displaying the address book to the member through the telecommunication messaging page.

18. The method of claim 11 further comprising:
identifying the telecommunication network used by the member of the social networking service;
identifying network elements in the telecommunication network that are operable to store the telecommunication messages;
transmitting requests for the telecommunication messages to the network elements; and
receiving the telecommunication messages from the network elements in response to the requests.

19. The method of claim 11 wherein the telecommunication messages comprise text messages associated with the directory number.

20. A network element comprising:
a control system operable to manage telecommunication messages addressed by users to a directory number assigned to a phone, wherein the phone is operated by a member of a web-based social networking service and the telecommunication messages are received at the phone from multiple other phones,
the control system further operable to collect the telecommunication messages for the phone received via the telecommunication network, to determine whether the telecommunication message involves a member of a web-based social networking service, and to generate a copy of the telecommunication message if the telecommunication message involves a member of a web-based social networking service; and
a network interface operable to send the copy of the telecommunication message to a telecommunication messaging system that is adapted to display the copy of the telecommunication message through a website for the social networking service, adapted to distinguish telecommunication messages addressed to the directory number that involve other members of the social networking service from telecommunication messages addressed to the directory number that do not involve other members of the social networking service, and adapted to highlight the telecommunication messages that involve other members in a telecommunication messaging page of the website.

* * * * *